Patented Aug. 11, 1942

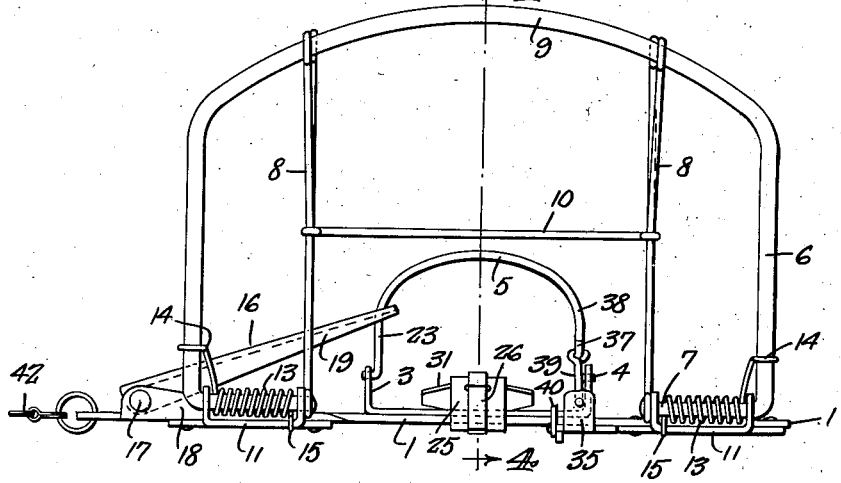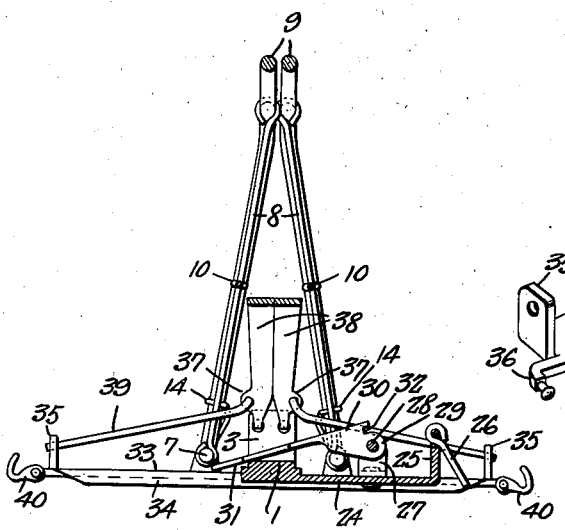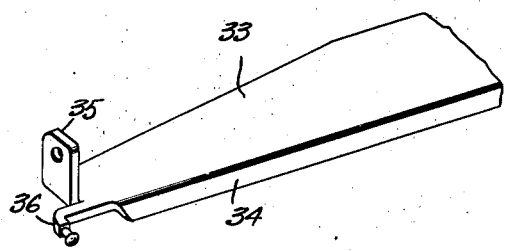

2,292,695

UNITED STATES PATENT OFFICE 2,292,695

ANIMAL TRAP

Leonard C. Johnson, Rio, Wis.

Application September 29, 1941, Serial No. 412,859

5 Claims. (Cl. 43—90)

This invention relates to animal traps, and its general object is to provide a trap that is primarily designed for trapping fur bearing animals and the like, in a humane manner, and with minimum mutilation, thus rendering the hide and fur free from damage and in a good salable condition.

An important object is to provide a trap that includes two pairs of spring closed jaws, namely an inner pair and an outer pair, the latter being of much greater size than the inner pair, to enclose a considerable large area about and outwardly beyond the same, as well as are associated with the inner jaws to be released thereby for closing, during the initial phase of the closing movement of the inner jaws, so that both pairs close to clamping position substantially simultaneously, to set up a double clamping or gripping engagement with the animal to not only render the animal helpless and thereby prevent self damage such as gnawing off caught legs, but in many instances paralyzing the animal and resulting in a quick and painless death.

A further object is to provide an animal trap of a four jaw type that can be set in an easy and expeditious manner, without injury, in that each pair is set separately and the outer pair can be held against closing, while setting the inner pair.

Another object is to provide a trap of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 3 is a side view of the trap in released position.

Figure 4 is a sectional view taken approximately on line 4—4 of Figure 3, looking in the direction of the arrows.

Figure 5 is a fragmentary detail perspective view, illustrating a portion of the cross bar that not only acts to steady the trap, but also as mounting means for the plunger latch rods of the outer jaws.

Figure 1:
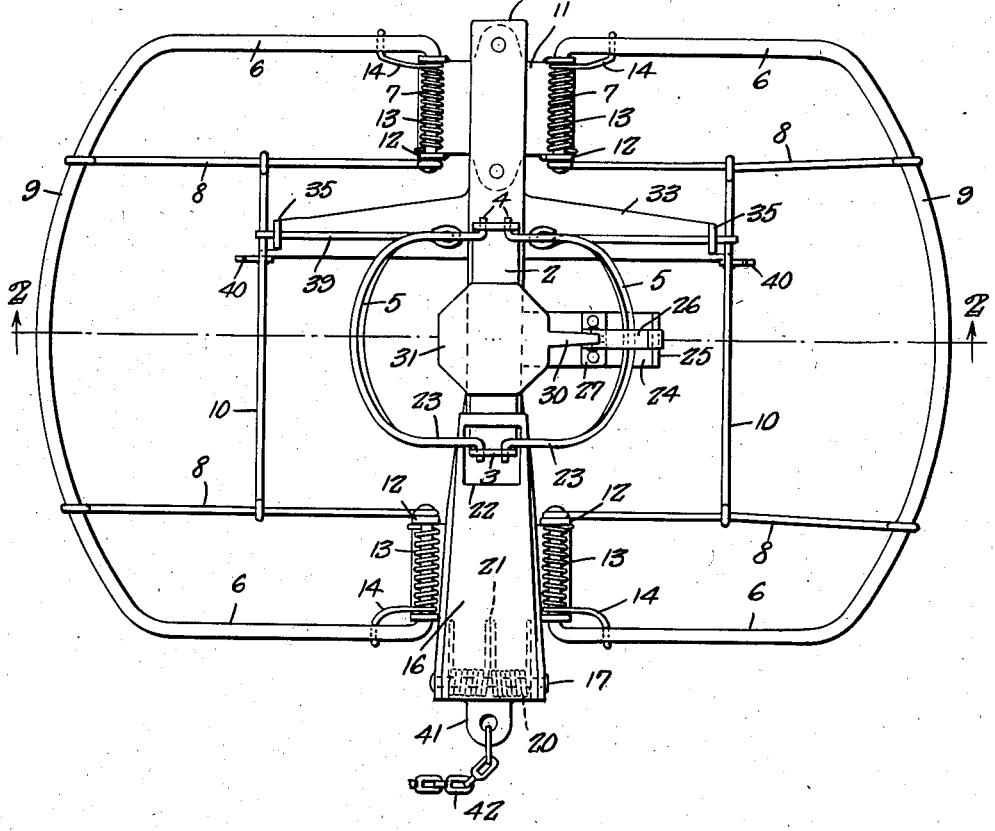
Figure 1 is a top plan view of my trap in set position.

Referring to the drawings in detail, the reference numeral 1 indicates an elongated strip providing the base of my trap, and the base has fixed along the length of its upper face and centrally of its ends, a strip like bracket 2 having upturned ends providing lugs 3, the latter each having a pair of parallel openings therein, as indicated in Figure 4. Mounted in the openings are the outturned trunnions 4 of a pair of companion substantially U-shaped inner jaws 5 movable toward and away from each other, for disposal to a substantially horizontal set or open position of Figures 1 and 2, or to a vertical closed or clamping position of Figures 3 and 4.

The outer jaws each include a relatively large outer frame 6 which is likewise of substantially U-shape formation and the arms of the frame 6 are bent inwardly toward each other to provide shaft like trunnions 7 that have fixed to the inner ends thereof one of the ends of rods 8, the latter paralleling the arms and have their opposite or outer ends fixed to the bight portion 9. Fixed to and bridging the rods 8 midway their ends, is a cross rod 10.

Fixed to the under face of the base strip 1 adjacent the ends thereof are mounting brackets 11 for the outer jaws, and the brackets are each made from a single blank of sheet material, and extend upon opposite sides of the bar. Each extending portion has a pair of upturned parallel ears 12 formed on the ends thereof, through which are mounted the shaft like trunnions 7 for movement of the outer jaws toward and away from each other, for disposal thereof to a horizontal set or open position of Figures 1 and 2 or to an upright closed or clamping position of Figures 3 and 4. Sleeved on the shaft like trunnions 7 are coil spring 13 that terminate in spring fingers 14 and 15, the fingers 14 being hooked about the arms of the frames 6, while the fingers 15 are hooked about the brackets 11, so that the springs urge and hold the outer jaws to and in their clamping position.

In order to move and hold the inner jaws to their clamping position, I provide a flat lever 16 that tapers inwardly toward its inner end, and the outer end of the lever is pivotally connected adjacent one end of the base strip, by a pivot pin 17 that extends through the outer wide end of tapered upturned flanges 18 formed on and along the length of the sides of the base strip for a portion thereof, as best shown in Figure 3, which likewise discloses that the lever has tapered downturned flanges 19 formed on and along the length of the sides thereof, with the pivot pin extending through the outer wide ends of the flanges 19 that are mounted between the flanges 18 for the lever to overlie the base strip.

Sleeved on the pivot pin 17 is a pair of coil springs 20 terminating in fingers 21 that bear against the base strip and lever respectively to urge and hold the latter to and in its raised position, as best shown in Figure 3, and the lever is provided with a rectangular opening 22 adjacent its inner end, through which extend the arms 23 of the inner jaws, for the sides of the opening to set up a wedging action against the arms to raise and hold the inner jaws to their clamping position, the wedging action being brought about, due to the fact that the arms 23 gradually increase in width from their juncture with the trunnions 4, as will be apparent upon inspection of Figure 4.

Fixed to the underside of the base midway its ends and extending laterally therefrom is a short strip-like arm 24 having its outer end portion bent at right angles to the horizontal portion thereof, to provide an upright lug 25 which has one end of a setting lever 26 pivotally connected thereto. Secured to and rising from the horizontal portion of the arm 24 is a pair of right angle brackets 27 and mounted between the uprights of the brackets 27 and on a pivot pin 28 bridging the upper ends thereof, is an ear 29 that is formed on and extends outwardly and downwardly from a trigger 30 of a flat hexagon shaped bait pan 31, which overlies the bracket 2 for disposal midway between the lugs 3 thereof, as clearly shown in Figure 1. The trigger 30 is notched as at 32 to provide a seat for receiving the free end of the setting lever 26 to hold the pan in its set position, as best shown in Figure 2. Instead of a single ear 29, a pair of ears may be provided, and in that event the pan, trigger and ears can be made from a single blank of sheet material, with the trigger and ear forming portion bent downwardly along its longitudinal center, for disposal of the ears in depending relation from the trigger.

Fixed to the under face of the base strip 1 adjacent to the end thereof opposite the lever 16 is a flat cross bar 33 of a length to extend a considerable distance beyond the opposite sides of the base strip to steady the trap when set, as will be apparent, and one side edge of the bar 33 is downturned to provide a reinforcing flange 34. The bar decreases in width toward its outer ends, and the latter has upturned apertured ears 35 formed thereon, as well as laterally directed stems 36 provided with heads at their outer ends, as clearly shown in Figure 5.

Figure 2:
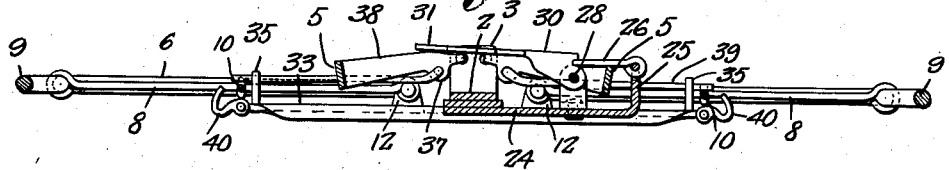
Figure 2 is a sectional view taken approximately on line 2—2 of Figure 1, looking in the direction of the arrows.

Apertured ears 37 are likewise formed on the arms 38 of the inner jaws and pivotally connected to the ears 37 are the inner ends of plunger latch rods 39 while the outer end portions of these rods are slidably mounted through the ears 35 for disposal in the path of the cross rods 10 to engage the same for holding the outer jaws in releasable set position, as clearly shown in Figure 1. Swingingly mounted on the stems 36 are latch hooks 40 which act as catches to engage the cross rods 10 to hold the outer jaws against casual movement to closed position. The latch hooks 40 not only facilitate setting the trap without injury, but makes it possible to use the inner jaws without use of the outer jaws, in the event it is desired, as for example for catching small rodents or the like.

Formed on the large end of the base strip 1 and extending outwardly therefrom is an apertured ear 41 to which is attached an anchoring chain 42.

From the above description and disclosure in the drawings, it is believed that the manner of setting my trap and the operation thereof may be obvious, but it might be mentioned that when it is desired to set the same, the outer jaws are moved against the action of the coil springs 13 and the latch hooks 40 are disposed about the rods 10. Pressure is then applied to the lever 16 for moving the latter against the action of its springs 20, to allow the inner jaws to be moved to their open position. Such movement of the inner jaws cause outward movement of the plunger latch rods 39 for the outer ends thereof to engage the cross rods 10. The inner jaws are held in open position by the engagement of the setting lever with one of the jaws for holding the arm 23 of the latter jaw against the upward pressure of the lever 16, as shown in Figure 1, and of course the setting lever is positioned in the notch 32 for holding the pan in set position. The other jaw remains open by the action of gravity, as will be apparent.

After all the parts have been arranged to their set position, the latch hooks are removed from the rods 10, assuming of course it is desired to use both pairs of jaws, with the result it will be seen that when the pan is tripped the jaw held by the setting lever will be released, and the lever 16 will move the inner jaws to their closed or clamping position. During the initial phase of the closing movement of the inner jaws, the latch rods 39 are moved out of engagement with the rods 10, thereby releasing the outer jaws to allow the latter to move to their closed or clamping position, with the result it will be seen that both pairs of jaws close substantially simultaneously, and due to the arrangement of the outer jaws with respect to the inner jaws, coupled with the fact that the former are approximately three times the size of the inner jaws, it will be further seen that the outer jaws enclose a considerable large area about and beyond the inner jaws, thus making it practically impossible for an animal to escape, as well as brings about the advantageous features previously set forth in the objects.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An animal trap comprising an elongated base, a pair of spring closed inner jaws pivotally mounted intermediate the ends of said base, a pair of spring closed outer jaws pivotally mounted adjacent the ends of said base for disposal about the inner jaws, a cross bar secured to and extending laterally upon opposite sides of the base, apertured ears formed on the ends of the cross bar, plunger latch rods slidably mounted through the ears for engagement with the outer jaws to hold the latter in set position, and said rods being pivotally connected to the inner jaws for releasing the outer jaws upon movement of the inner jaws to closed position.

2. An animal trap comprising an elongated base, a pair of spring closed inner jaws pivotally mounted intermediate the ends of said base, brackets secured to the base adjacent its ends, a pair of outer jaws, each including a relatively large substantially U-shaped frame, inwardly directed trunnions formed on the inner ends of the arms of the frames and mounted in the brackets for movement of the outer jaws toward and away from each other and for disposal about the inner jaws, springs sleeved on the trunnions for urging and holding the outer jaws to and in closed position, rods paralleling said arms and having their ends fixed to the inner ends of the trunnions and bight portions of the frames respectively, cross rods secured to and bridging the first rods, and latching means engageable with the cross rods for holding the outer jaws in set position and being connected to the inner jaws to be released from the cross rods upon movement of the inner jaws to closed position.

3. An animal trap comprising an elongated base, a pair of spring closed inner jaws pivotally mounted intermediate the ends of said base, brackets secured to the base adjacent its ends and extending upon opposite sides thereof, a pair of parallel ears formed on each extending portion of the brackets, a pair of outer jaws, each including a relatively large substantially U-shaped frame, inwardly directed shaft like trunnions formed on the inner ends of the arms of the frames and mounted in the ears for movement of the outer jaws toward and away from each other and for disposal about the inner jaws, springs engaged with said arms and the brackets for urging and holding the outer jaws to and in closed position, means paralleling said arms and fixed to the inner ends of the trunnions and bight portions of the frames respectively, cross rods secured to and bridging said means, and plunger latch rods engageable with the cross rods for holding the outer jaws in set position and being pivotally connected to the inner jaws to be released from the cross rods upon movement of the inner jaws to closed position.

4. An animal trap comprising an elongated base, a pair of spring closed inner jaws pivotally mounted intermediate the ends of said base, brackets secured to the base adjacent its ends and extending upon opposite sides thereof, a pair of parallel ears formed on each extending portion of the brackets, a pair of outer jaws, each including a relatively large substantially U-shaped frame, inwardly directed shaft like trunnions formed on the inner ends of the arms of the frames and mounted in the ears for movement of the outer jaws toward and away from each other and for disposal about the inner jaws, springs engaged with said arms and the brackets for urging and holding the outer jaws to and in closed position, means paralleling said arms and fixed to the inner ends of the trunnions and bight portions of the frames respectively, cross rods secured to and bridging said means, plunger latch rods engageable with the cross rods for holding the outer jaws in set position and being pivotally connected to the inner jaws to be released from the cross rods upon movement of the inner jaws to closed position, and manually actuated pivotally mounted hooks arranged in the path of the cross rods for engagement therewith to hold the outer jaws in set position.

5. An animal trap comprising a strip like base, said base increasing in width for a portion of its length toward one end, upturned flanges formed on the sides of the wide portion of said base, a pair of inner jaws pivotally mounted intermediate the ends of said base for movement toward and away from each other, a spring pressed arm, downturned flanges formed on the sides of the arm along the length thereof and mounted between the first flanges, a pivot pin extending through the outer ends of the flanges for connecting the arm to the base for movement relative thereto along its length and normally urged therefrom, said arm having a rectangular opening adjacent its free end with said jaws extending through the opening for engagement of the sides of the opening with the jaws to move and hold the latter to closed position, a pivotally mounted bait pan overlying the base for disposal within the jaws, a trigger formed on the pan, a pivotally mounted setting lever engageable with one of said jaws and the trigger for holding the bait pan and jaws in set position against the action of the arm, a pair of spring closed outer jaws pivotally mounted adjacent the ends of said base for disposal about the inner jaws, latching means engageable with the outer jaws for holding the latter in set position and carried by the inner jaws to be automatically released from the outer jaws upon movement of the inner jaws to closed position, and manually actuated means for holding the outer jaws in set position.

LEONARD C. JOHNSON.